Patented Mar. 17, 1936

2,034,220

UNITED STATES PATENT OFFICE 2,034,220

LIGHT-SENSITIVE LAYER AND METHOD OF PRODUCING COLORED PICTURES

Donald K. Allison, Los Angeles, Calif., assignor, by mesne assignments, to Detracolor, Ltd., a corporation of Nevada No Drawing. Application August 22, 1932, Serial No. 629,874

11 Claims. (Cl. 95—6)

My invention relates broadly to the art of color photography and more particularly to a film or other medium for use in that art which will render a photograph in color upon very simple treatment after exposure. Specifically I employ what may be termed a latent dye, or a leuco base as more generally known to the dye art, in combination with a photographic emulsion or other light sensitive substance suitable for photographic use.

It is an object of my invention to provide a photographic film which can be exposed in the usual way and which will have an invisible or latent dye therein of such a nature that upon subsequent treatment it will assume a predetermined color to give a photograph in that color.

It is a further object of my invention to control the potential color of the photograph by a proper selection of the latent dye or leuco base used in the making of the photographic medium so that it will be possible to secure a photograph in any color desired by using a substantially standard or uniform process of treating the exposed film.

It is also an object of my invention to provide a method of treating an exposed film of the type described so as to bring out the color of the latent dye or leuco base.

It is another object of my invention to provide a film having impregnated therein a leuco base, which said film has not lost any of its photographic sensitivity by reason of the presence of the leuco base.

My invention finds application in both branches of the photographic art, namely, still photography and motion picture photography, and will be found to be equally applicable to both of these branches. It has long been recognized that the coldness of the black and white images obtained by the customary methods of photography employing the usual type of film or plate is not desirable and various remedies for this objection have been proposed and tried. The most common means used for coloring photographs, whether they be from a still camera or from a motion picture camera, are toning, dyeing and dye-toning, all of which are cumbersome and otherwise rather unsatisfactory from both the artistic and the commercial viewpoint. The advantage of having the coloring medium in the film before exposure is obvious when it is realized that this can be accomplished during the manufacture of the film.

The chief obstacle in color work heretofore, particularly in amateur work, is that the methods of coloring have been so complicated and unstable that it required a highly specialized staff and equipment to operate a given process and even then uniform results were difficult of attainment. It is therefore an object of my invention to provide a film which can be exposed in the manner now customarily used, and which can then have its latent color brought out by a process so simple and uniform in its operation that anyone familiar with, and equipped to do ordinary developing can treat the film in the course of development so as to bring out a colored image.

These and some of the other objects and advantages of my invention will become apparent from the following detailed description of a preferred form of my invention.

In making a film according to my invention I find it preferable to mix into the gelatin solution containing a light sensitive salt, such as silver bromide for instance, a solution of a suitable leuco base. The leuco base is chosen according to the color desired and with due regard to availability and cost. If desired the coated film may be soaked in a solution of leuco base to impregnate it sufficiently for satisfactory use, or if preferred the dry leuco base can be mixed in the coating solution. The particular state of the leuco base at the time of using and the exact time of impregnating form no part of my invention, and can be varied at will depending on localized conditions in the production of the finished film ready for exposure.

Broadly speaking all leuco bases of the aniline dyes may be used in the practice of my invention, but I have found that certain of this class of dyes are more satisfactory than others, in that they are more stable. As is well known to the chemical and dye arts aniline dyes may be subdivided into numerous series or families, each of which is again subdivisible into the many dyes commonly known.

The leuco bases of many dyes of the diphenylmethane series of the general formula

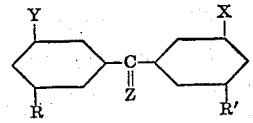

where $x$, $y$ and $z$ are either substituted or unsubstituted amino groups, and R and R' are alkyl, alkoxy or hydroxyl groups can be impregnated in a photographic emulsion without in any way destroying or diminishing the light sensitivity of the emulsion and upon proper treatment will yield a color depending on the structure of the particular base used.

Likewise the leuco bases of many of the dyes of the triphenylmethane series of the general formula of

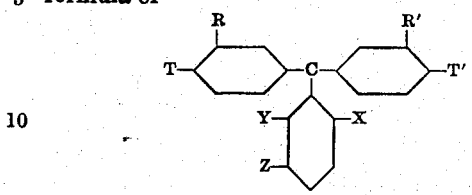

where $x$ and $y$ and $z$ are halogen groups R and R' alkyl, alkoxy or hydroxyl groups and T and T' are substituted or unsubstituted amino groups, may be used as can the leuco bases of dyes of the azine series of the general formula of

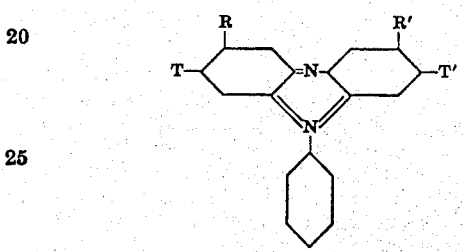

where R and R' are alkyl, alkoxy or hydroxyl groups and T and T' are substituted or unsubstituted amino groups; the thiazine series of the general formula of

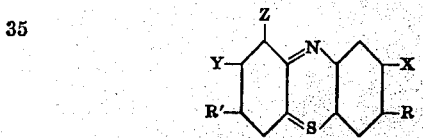

where R and R' are alkyl, alkoxy or hydroxyl groups and $x$, $y$ and $z$ are nitro halogens; and the acridine series of the general formula of

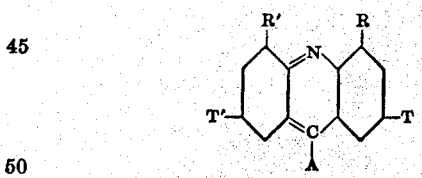

where R and R' are alkyl, alkoxy or hydroxyl groups, T and T' are substituted or unsubstituted amino groups and A may or may not be a hydrogen methyl or phenyl group.

After the light sensitive emulsion has been impregnated with a suitable leuco base, say for example, leucomethylene blue of the thiazine series, leucauramine of the diphenylmethane series or some other leuco base from the other series, the film is exposed in the usual manner. It will be evident that in the operation of my invention the leuco base can be used in either a negative or positive film or both if desired. However, it will seldom be desired to color the negative as it is used primarily for producing positive prints. I prefer, therefore, to produce the usual black and white negative using a standard film with no leuco base therein. This negative after developing, fixing, washing and drying is then used to print to a positive film which I have impregnated with a leuco base. When in this description I use the term expose it is to be deemed to include exposure of the negative in a camera and also the exposure of the positive stock to the printing light coming to it through the negative.

The positive stock after printing contains a latent silver image and throughout the emulsion a latent dye. It is then developed in any standard developer such as Elon or hydroquinone or other suitable substances and given a thorough acid water wash to arrest further development and to wash out surplus developing solution. At this stage the film may be then treated with a suitable "fixing solution", although this may not be necessary, depending on the subsequent processing. The film at this stage contains a black silver image which shades down to gray in its lesser densities with clear spaces where no light passed through the negative in printing. The leuco base is still unaffected at this point. The film is now immersed in a solution which will oxidize the free silver to a silver salt which will in turn mordant the leuco base in situ. This oxidation step causes the leuco base to assume its predetermined color. A solution, suitable for oxidizing the free silver and mordanting the dye in situ as its color is formed may be made up as follows:

Potassium ferricyanide_____ 5 g.
Chromic acid_____ 1 g.
Copper sulphate_____ 2 g.
Hydrochloric acid (conc.)_____ 5 c. c.
Water to make_____ 1 liter I have also found that a solution of chlorine water or bromine water will serve admirably as an oxidizing agent to convert the silver to a salt which will mordant the dye in situ.

The film is now given a thorough water wash to remove excess oxidizer and all dye not mordanted in the images and is immersed in a fixing solution containing sodium thiosulphate and tannic acid which removes the translucent silver salt by forming a soluble silver complex. The treating solution is also a mordant for the leuco dye and remordants it in situ, giving a suitably transparent image in color. After another water wash the film is dried and is ready for use.

While I have only described my invention in detail for the production of an image in one color it will be understood that my invention also comprehends many variations and combinations of this principle and many different dyes, oxidizers and fixing agents may be used without in any way departing from the proper scope of my invention.

For instance my invention is readily applicable to the so-called bi-pack method of color photography wherein two color selection negatives are secured, say, one recording blue color values and the other one recording red color values. These two negatives are by means well known in the art printed in register to opposite sides of a positive having a light sensitive emulsion on each side thereof. One emulsion may have a latent blue dye or leuco base impregnated therein and the other may have a latent red dye or leuco base impregnated therein. The film is then treated as hereinbefore mentioned for a single emulsion with the result that on one side of the positive a red image is produced and on the opposite side a complementary image in blue is produced; the result being that when projected a two-color picture is thrown on the screen.

These and other variations of my invention which will be evident to those skilled in the art I believe are all within the scope of my invention defined by the appended claims.

I claim as my invention:
1. In a photographic film: an emulsion impregnated with a light sensitive silver salt and with the leuco base of a basic dye of the diphenylmethane series of aniline dyes.

2. In a photographic film the combination of: a light sensitive silver salt and a leuco base of a dye of the general formula of

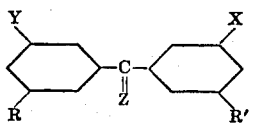

where X, Y and Z are substituted or unsubstituted amino groups and R and R' are alkyl, alkoxy or hydroxyl groups.

3. In a photographic film the combination of a light sensitive silver salt and the leuco base of a dye of the diphenylmethane series.

4. A photographic film having an emulsion layer containing a light sensitive silver salt and leucauramine.

5. The method of producing a photograph in color which includes: impregnating an emulsion containing a light sensitive silver salt with the leuco base of a dye of the diphenylmethane series of aniline dyes; exposing said impregnated emulsion to light; developing said emulsion; oxidizing said leuco base to cause it to assume its predetermined color while oxidizing the image obtained by said development to a substance which mordants said dye; and washing out the excess dye from said emulsion.

6. The method of producing a photograph in color which includes: forming a layer of gelatin containing light sensitive silver salt containing the leuco base of a diphenylmethane dye; exposing said layer to light; treating said layer to bring out the latent image formed; and causing the leuco base to assume its predetermined color.

7. The method of producing a photograph in color which includes: impregnating an emulsion containing a light sensitive silver salt with the leuco base of a diphenylmethane dye; exposing said medium; developing the latent images thereby obtained; and oxidizing said leuco base into its dye form.

8. The method of producing a photograph in color which includes: impregnating an emulsion containing a light sensitive silver salt with the leuco base of a diphenylmethane dye; exposing said medium to light; developing the latent images thereby obtained; oxidizing said leuco base into its dye form; and mordanting said dye to said image.

9. The method of producing a photograph in color which includes: exposing a film having a light sensitive silver salt therein impregnated with the leuco base of a diphenylmethane dye; developing the latent image obtained by said exposure; treating said film to bring out the color of said leuco base and to make said image a mordant for said dye; and removing said dye from the unexposed portions of said film.

10. The method of producing a photograph in color which includes: exposing a film having a light sensitive silver salt therein impregnated with the leuco base of a diphenylmethane dye; developing the latent image obtained by said exposure; oxidizing said leuco base to its color dye form and said image to make it a mordant for said dye; and washing out said dye in the unexposed portions of said film.

11. The method of producing a photograph in color which includes: exposing a film having a light sensitive silver salt therein impregnated with leucauramine; developing the latent image obtained by said exposure; oxidizing said leuco base to its color dye form and said image to make it a mordant for said dye; and washing out said dye in the unexposed portions of said film.

DONALD K. ALLISON.